Sept. 22, 1942.  R. H. MUSTONEN  2,296,731
STOP MECHANISM FOR GRINDING MACHINES
Filed March 12, 1941
FIG.1.
FIG.3.
FIG.2.
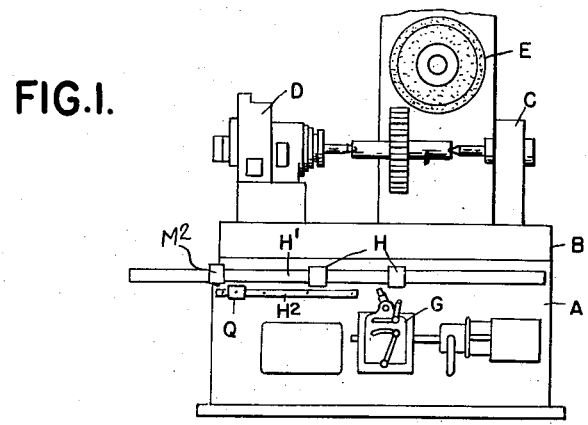
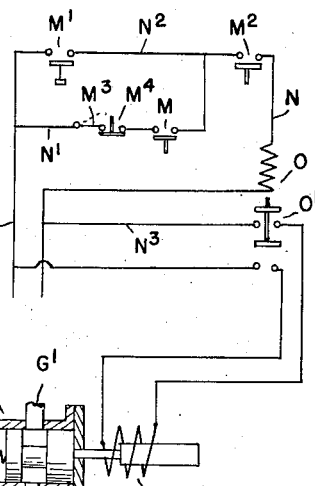
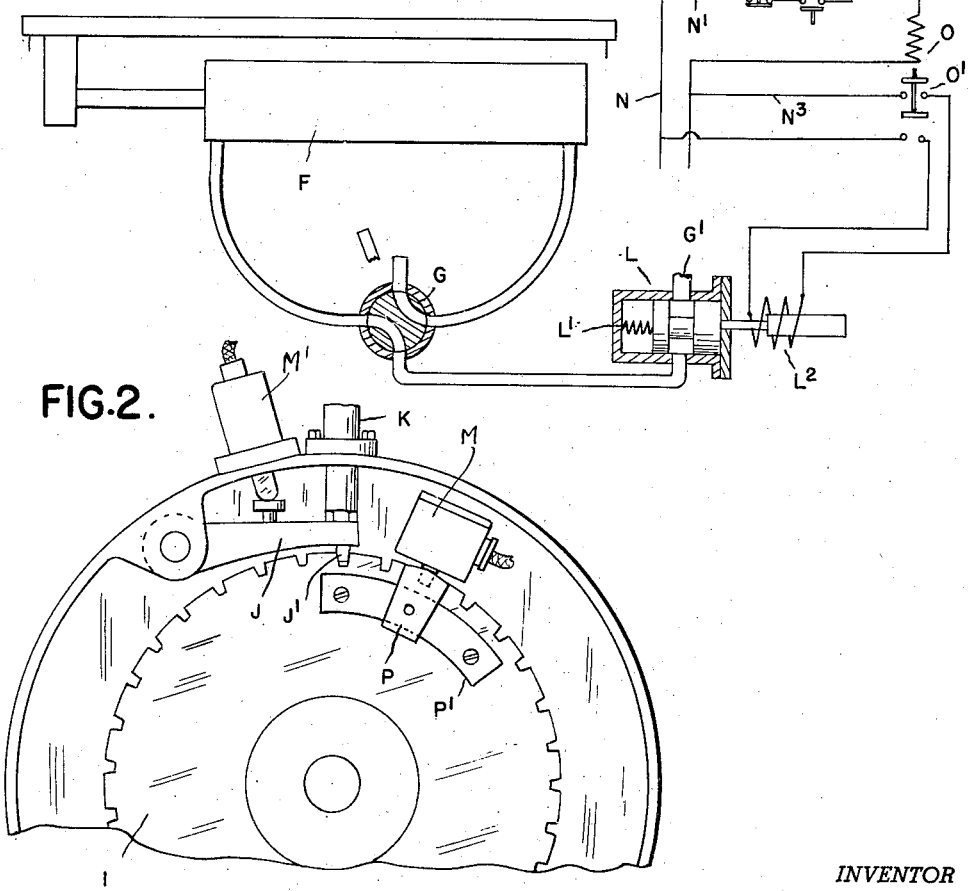
*INVENTOR*
REINO H. MUSTONEN
BY *Whittemore Hulbert & Belknap*
*ATTORNEYS*

Patented Sept. 22, 1942

2,296,731

UNITED STATES PATENT OFFICE 2,296,731

STOP MECHANISM FOR GRINDING MACHINES

Reino H. Mustonen, Detroit, Mich., assignor to The Gear Grinding Machine Company, Hamtramck, Mich., a corporation of Michigan Application March 12, 1941, Serial No. 383,021

3 Claims. (Cl. 51—92)

The invention relates to gear grinding machines of that type comprising a hydraulically actuated reciprocatory carriage for relatively moving the work and grinder in operative relation to each other, together with a periodically operated indexing mechanism for the work. The indexing mechanism is also usually operated by a hydraulic motor, and the timing is such that the indexing occurs during that portion of the reciprocatory movement of the carriage when the grinder is out of contact with the work. It is essential that each indexing movement should be fully completed prior to the beginning of a succeeding grinding operation, and it is also desirable that at the completion of a cycle of successive grinding operations the machine should be stopped before entering another cycle.

It is the object of the invention to obtain a construction of automatically controlled stop mechanism, which functions first to stop the operation of the machine on failure of the indexing mechanism to fully complete its operation, and second, to stop the machine after the completion of a cycle. To this end, the invention consists in the construction as hereinafter set forth.

In the drawing:

Fig. 1 is a side elevation of a grinding machine to which my improvements are applied;

Fig. 2 is a sectional elevation of a portion of the indexing mechanism; and

Fig. 3 is a diagram illustrating the operation of the automatic stop mechanism.

As shown in Fig. 1, A is the bed of a grinding machine; B a reciprocatory carriage or table mounted thereon; C a mounting for the work; D an indexing mechanism; and E a grinder wheel which is mounted in fixed relation to the bed and in operative relation to the work. The carriage or table B is actuated by a reciprocatory hydraulic motor F, which is controlled in its movements by a reversing valve G. This valve in turn is controlled by dogs H carried by the table and preferably adjustably mounted upon a longitudinally extending bar H'. The indexing mechanism is also preferably hydraulically operated and, intermediate periodic operations, is locked against movement. The detailed construction of the indexing mechanism and its operating means is not essential to the instant invention and therefore is not fully illustrated. However, it includes a peripherally notched locking disc I, a pivoted dog J provided with a tooth J' for engaging the notches, and an operator K for disengaging the dog before rotation of the disc and reengaging it after movement to the next succeeding notch.

My improved stop mechanism includes a valve L which is located in the fluid supply conduit G' to the reversing valve G. This valve L is held normally in open position by suitable means such as a spring L' and under certain conditions is closed, preferably by electromagnetic means including a solenoid $L^2$. Thus, any time that this solenoid is energized, the valve will be instantaneously closed and, by stopping flow of fluid to the valve G and motor F, will arrest movement of the carriage. The solenoid $L^2$ is included in an electrical circuit which is controlled by a plurality of switches. One of these switches M is normally open, but is closed upon the completion of an indexing cycle. Another switch M', which is open when the indexing mechanism is idle, is closed by the unlocking of this indexing mechanism and is not again opened until the indexing has been completed and the disc I again fully locked. A third switch $M^2$, normally open, is closed by movement of the carriage just in advance of contact between the grinder wheel and the work.

These several switches are arranged in an electrical control circuit including a main circuit N and branch circuits N' and $N^2$ in series therewith. The main circuit includes an electromagnet O for operating a switch O', which supplies electrical energy to the solenoid $L^2$. The switch $M^2$ is included in the main circuit N; the switch M in the branch circuit N'; and the switch M' in the branch circuit $N^2$. There are also included in the branch N' a normally open selector switch $M^3$ and a normally closed push button starting switch $M^4$. In relation to the mechanism, the switch M is arranged at a point adjacent to the periphery of the locking disc I and is operated by a dog P adjustably secured to a segmental bar P' attached to one side of said disc. This dog may be so adjusted that when the pin J' of the locking dog J engages the last notch of a complete cycle, the dog will operate the switch M to close the same. The switch M' is located adjacent to the dog J so that withdrawal of the pin J' from the notch of the disc I will close said switch, which will not be again opened until the pin J' is fully engaged with another notch. The switch $M^2$ is mounted on the table of the machine, and a cam dog Q, adjustably secured on a bar $H^2$ mounted on the bed is so set as to engage the switch $M^2$ and close the same just in advance of contact between the work and the grinder wheel.

Operation

Assuming that the work has been properly adjusted with respect to the indexing mechanism and that the dogs H which operate the reversing valve G have been adjusted for the required length of the movement of the carriage B, the motor or motors (not shown) are started. One motor revolves the grinder wheel, while another motor actuates a hydraulic pump (not shown), which supplies fluid under pressure through the conduit G', first to the valve L and second, to the valve G in series therewith. The carriage B will then be reciprocated to move the work back and forth across the grinder wheel, and during the portion of said movement where the grinder and work are out of contact, the indexing mechanism will be operated. After each indexing movement, the cycle will be repeated, and in the absence of my improved automatic control, the cycles would continue without interruption.

Automatic stop

Inasmuch as the hydraulic fluid passes through the valve L before reaching the valve G which controls the operation of the motor F, it is obvious that the closure of the valve L will instantaneously arrest movement of the motor and of the carriage actuated thereby. The valve L is held normally open by the spring L', but will be closed whenever the solenoid $L^2$ is energized. The current for energizing the solenoid is supplied through the electric circuit $N^3$ controlled by the switch O', which in turn is controlled by the electromagnet O in the electric circuit N. Consequently, the valve L will remain open unless the electric circuit N is closed.

Safety stop

In normal operation, the electric switches M' and $M^2$, which are in series, are never simultaneously closed, and therefore the circuit N remains open. The switch M' is closed during the operation of the indexing mechanism, but is open at the completion of this operation, while the switch $M^2$ is open during the operation of the indexing mechanism, but is closed during the movement of the carriage slightly in advance of contact between the work and the grinder wheel.

When an index failure occurs, i. e., where the index tooth J' fails to completely seat in a notch in the disc I, this will hold the switch M' closed, and as the table advances, the switch $M^2$ will be closed by the operation of the cam dog Q. As soon as this occurs, the circuit N will be closed, which, by closing the switch O', will energize the solenoid $L^2$, closing the valve L and, by stopping flow of the hydraulic fluid through the conduit G', will arrest movement of the motor F and carriage B. It is to be noted that the cam dog Q is so set as to remain in contact with the switch $M^2$ to hold the same closed when the table is stopped. The only way to restart the table is to clear the mis-index by manual indexing, whereupon the tooth J' is again properly seated, thereby opening the switch M'. This will deenergize the solenoid, opening the valve L and restoring normal operation.

Cycle stop

As above stated, it is sometimes desirable to stop the operation of the machine after the completion of a cycle of indexing operations. Where this is desired, the normally open selector switch $M^3$ in the branch circuit N' is manually closed, the starting switch $M^4$ remaining closed and the switch M being normally open. Thus the branch circuit N' remains open until the completion of the last grinding operation of an index cycle, after which the final indexing operation will bring the dog P into a position to close the switch M. Thus, when the switch $M^2$ is closed by the cam dog Q, the carriage will be stopped prior to contact of the work with the grinder wheel. Should it be desired to start another cycle, this may be accomplished by opening the branch circuit N, either through the selector switch $M^3$ or a push button starter switch $M^4$. This will deenergize the solenoid $L^2$ and permit the opening of the valve L by the spring L'. Neither of these manual operations will, however, start the machine, if there has been a failure in the operation of the indexing mechanism.

What I claim as my invention is:

1. In a grinding machine, the combination with a rotary grinder, a work support, a carriage for reciprocating the one in operative relation to the other, a hydraulic motor for actuating said carriage, and an indexing mechanism for the work automatically operated during a portion of the reciprocatory movement of said carriage, of a normally open valve controlling the supply of fluid to said motor, automatic means for closing said valve to arrest movement of said carriage upon failure of said indexing mechanism to complete an indexing movement, and further means for automatically closing said valve upon completion of an indexing cycle.

2. In a grinding machine, the combination with a rotary grinder, a work support, a carriage for reciprocating the one in operative relation to the other, a hydraulic motor for actuating said carriage, and an indexing mechanism for the work automatically operated during a portion of the reciprocatory movement of said carriage and including a locking dog, of a normally open valve controlling the supply of fluid to said motor, electromagnetic means for closing said valve to arrest movement of said carriage, and controlling means for said electromagnetic means including an electric circuit having three normally open switches therein, two of said switches being in separate branches of said circuit and a third switch in series with each of said branches, said switches in the branch circuits being operatively associated with said indexing mechanism, the one to be closed whenever said locking dog is out of fully locked position and the other adapted to be closed during the last indexing operation of a cycle, and said series switch being positioned to be closed by the movement of said carriage in advance of contacting said rotary grinder with said work, whereby movement of said carriage is arrested either upon failure of any indexing operation or upon the completion of an indexing cycle.

3. In a grinding machine, the combination with a rotary grinder, a work support, a carriage for reciprocating the one in operative relation to the other, a hydraulic motor for actuating said carriage, and an indexing mechanism for the work automatically operated during a portion of the reciprocatory movement of said carriage and including a locking dog, of a normally open valve controlling the supply of fluid to said motor, electromagnetic means for closing said valve to arrest movement of said carriage, and controlling means for said electromagnetic means including an electric circuit having three normally open switches therein, two of said switches being in separate branches of said circuit and a third switch in series with each of said branches, said switches in the branch circuits being operatively associated with said indexing mechanism, the one to be closed whenever said locking dog is out of fully locked position and the other adapted to be closed during the last indexing operation of a cycle, and said series switch being positioned to be closed by the movement of said carriage in advance of contacting said rotary grinder with said work, whereby movement of said carriage is arrested either upon failure of any indexing operation or upon the completion of an indexing cycle, and a manually operable, normally closed switch in the branch circuit containing the switch closed by the last indexing operation, said manually operable switch providing for the opening of said branch circuit to cause a repetition of the cycle.

REINO H. MUSTONEN.